United States Patent
Li

(10) Patent No.: US 7,586,883 B2
(45) Date of Patent: Sep. 8, 2009

(54) METHOD FOR IMPROVING THE TRANSMISSION SPEED IN MULTI-SLOT CDMA WIRELESS COMMUNICATION SYSTEM

(75) Inventor: Shihe Li, Beijing (CN)

(73) Assignee: Da Tang Mobile Communications Equipment Co., Ltd., Beijing (CN)

( * ) Notice: Subject to any disclaimer, the term of this patent is extended or adjusted under 35 U.S.C. 154(b) by 586 days.

(21) Appl. No.: 11/252,047

(22) Filed: Oct. 17, 2005

(65) Prior Publication Data

US 2006/0087997 A1    Apr. 27, 2006

Related U.S. Application Data

(63) Continuation of application No. PCT/CN2004/000359, filed on Apr. 15, 2004.

(30) Foreign Application Priority Data

Apr. 15, 2003    (CN) .............................. 03 1 09756

(51) Int. Cl.
*H04B 7/212* (2006.01)
(52) U.S. Cl. .................. 370/337; 370/335; 370/342; 370/347; 370/441; 370/442
(58) Field of Classification Search .................. None
See application file for complete search history.

(56) References Cited

U.S. PATENT DOCUMENTS

| | | | |
|---|---|---|---|
| 6,493,334 B1 * | 12/2002 | Krzymien et al. | 370/342 |
| 6,813,277 B2 * | 11/2004 | Edmon et al. | 370/442 |
| 6,985,498 B2 * | 1/2006 | Laroia et al. | 370/478 |
| 7,230,931 B2 * | 6/2007 | Struhsaker | 370/280 |
| 7,308,020 B2 * | 12/2007 | Ishii et al. | 375/148 |
| 2002/0057709 A1 * | 5/2002 | Edmon et al. | 370/442 |
| 2003/0171121 A1 * | 9/2003 | Kim et al. | 455/451 |
| 2004/0198404 A1 * | 10/2004 | Attar et al. | 455/522 |

FOREIGN PATENT DOCUMENTS

| | | |
|---|---|---|
| CN | 1362807 | 8/2002 |
| WO | WO 93/15573 | 8/1993 |
| WO | WO 99/22474 | 5/1999 |

OTHER PUBLICATIONS

International Search Report for PCT/CN2004/000359 dated Jul. 10, 2004.

* cited by examiner

*Primary Examiner*—Jayanti K Patel
*Assistant Examiner*—Tito Pham

(57) ABSTRACT

The present invention discloses a method for improving the performance of the CDMA TDD wireless communication system. It is a method for increasing the transmission rate in a multi-slot CDMA system. The method comprises combining a plurality of neighboring time slots to form a combined time slot with a length of integer times of the length of the original time slot, wherein the modulation modes adopted by the combined time slot are not limited, and transmitting traffic data with at least one service data field in the combined time slot, and using the guard period in the combined time slot for guard between combined time slots.

6 Claims, 3 Drawing Sheets

METHOD FOR IMPROVING THE TRANSMISSION SPEED IN MULTI-SLOT CDMA WIRELESS COMMUNICATION SYSTEM

CROSS-REFERENCE TO RELATED APPLICATIONS

This application is a continuation of PCT/CN2004/000359 filed Apr. 15, 2004, which was published under the Patent Cooperation Treaty in Chinese on Oct. 28, 2004, and which is hereby incorporated herein in its entirety by reference, and this application also claims the benefit of Chinese Patent Application No. 03109756.1, filed Apr. 15, 2003.

FIELD OF THE TECHNOLOGY

The present invention relates to wireless mobile communication technology, and more particularly to a method for increasing the transmission rate in a multi-slot CDMA wireless communication system, (i.e. a method for improving the performance of the CDMA TDD mobile communication system of third generation mobile communication networks.)

BACKGROUND OF THE INVENTION

In general, the present third generation mobile communication system, especially CDMA TDD (Code Division Multiple Access Time Division Duplex) standard system including the 3.84 Mbps UTRA TDD standard system and the 1.28 Mbps TD-SCDMA standard system, as are known in the art, adopt multi-slot frame structures. The multi-slot frame designed according to UTRA TDD standard has 15 time slots, and the multi-slot frame designed according to TD-SCDMA standard has 7 traffic time slots. A CDMA mode with a maximum spreading factor of 16 is used in every time slot.

FIG. 1 shows a frame structure of the TD-SCDMA. In each 5-ms sub-frame, there are seven traffic time slots: TS0 10, TS1 11, TS2 12, TS3 13, TS4 14, TS5 15, TS6 16, and three special time slots: the downlink pilot time slot DwPTS 17, the main Guard Period G 18 and the uplink pilot time slot UpPTS 19. Every traffic time slot has 864 chips with the duration of 675 μs. Each time slot is divided into four fields: two service data fields 20, 22, one midamble 21 and one guard period 23. The midamble has duration of 144 chips, the GP has duration of 16 chips, and the two data fields are of 352 chips each. When the spreading factor is 16, each of the two service data fields can transmit 22 symbols, which is equivalent to transmission rate of 17.6 kbps in the modulation mode of Quaternary Phase Shift Keying (QPSK).

When a higher transmission rate is needed, multi-channel technique or a lower spreading factor is usually adopted. In this case, the maximum transmission rate of a traffic time slot is 16×17.6 kbps=281.6 kbps. When a much higher transmission rate is needed, multiple slots may be used for transmission, for example, the maximum transmission rate of two traffic time slots can be 563.2 kbps, the maximum transmission rate of three traffic time slots can be 844.8 kbps, and so on.

In summary, at present, all of the third generation mobile communication systems adopt the CDMA technology. In the TDD CDMA standard, in order to support asymmetric DL/UL allocation, multi-slot frame structure is adopted; and in order to provide high-speed data services, variable spreading factor, multi-channel or multi-slot techniques are utilized.

Nevertheless, the foregoing approaches have the following disadvantages:

1. The transmission rate of the data is not high enough. Take the TD-SCDMA system as an example. According to the requirements of the 3GPP specifications, when the transmission rate is less than 8 kbps, only one code channel in one time slot is needed for data transmission; when a voice signal with a transmission rate of 12.2 kbps is to be transmitted, it can be transmitted with two code channels in one time slot or by decreasing the spreading factor to 8. But in either case, the transmitting power of a terminal would be double of the transmitting power needed for a channel with a spreading factor of 16. As mentioned above, the maximum transmission rate of one time slot is 128 kbps, then a service requiring a transmission rate of 384 kbps needs at least 3 time slots. And when the channel coding takes R=⅓, the ratio of puncturing is very high, which results in obviously degraded performance. In order to transmit a service with a transmission rate of 2 Mbps in the TD-SCDMA system, 5 time slots and the 8PSK modulation mode are required. As a result, one carrier frequency can only provide one-way transmission of a service requiring the rate of 2 Mbps. Therefore, up to now, how to increase the data transmission rate of a CDMA TDD system is still an unsolved problem.

2. It is quite difficult to design the user terminal. Regardless of which kind of CDMA TDD technique of the third generation mobile communication standard (UTRA TDD or TD-SCDMA) is adopted, a midamble (as shown by 21 in FIG. 1) is incorporated in a frame, and the joint detection technique is used. Because of the complexity of the joint detection algorithm, the multi-user detection for the user terminal designed at present could be used on the signal of a single time slot, which means the user terminal at present can receive the signal from at most one time slot. In other words, the maximum transmission rate of a service supported by some low-end user terminals is 128 (or 144 ) kbps. To support 384 kbps or 2 Mbps service, the user terminal must have multiple demodulators, which inevitably lead to the user terminal a bigger size, more power consumption, and higher cost.

3. The coverage of the cell is limited. Based on the operating principle of CDMA, when using a lower spreading factor or a plurality of code channels to transmit the traffic data, the transmitting power would be multiple times of the power by using a single channel with a high spreading factor. If the maximum transmitting power of the user terminal is fixed, the communication distance is limited, so is the cell coverage; if the transmitting power of the user terminal is big enough, when the power consumption is increased, the operating time of the batteries of the user terminal is decreased accordingly.

SUMMARY OF THE INVENTION

It is an object of the present invention to provide a method for increasing the transmission rate in a multi-slot CDMA wireless communication system such that, while improving the capability of data transmission of the user, the number of the code channels occupied by the user terminal when transmitting signals can be decreased or the maximum transmitting power of the user terminal can be reduced, thereby enlarging the coverage of the cell, reducing power consumption and demodulation complexity of the user terminal, and lowering the cost thereof.

The technical scheme for achieving the object of the present invention can be as follows: a method for increasing the transmission rate in a multi-slot CDMA wireless communication system, comprising:

A. combining a plurality of neighboring time slots into one combined time slot of which the length is integer times of the length of the original single time slot, wherein the combined time slot comprises at least one service data field and one guard period, and the modulation mode adopted by the combined time slot is not limited; and B. transmitting the traffic data with at least one service data field in the combined time slot, and providing guard between combined time slots by using one guard period in the combined time slot.

One embodiment of the present invention discloses a new multi-slot combination technique. By combining two or a plurality of time slots to form a large time slot, using (or not using) a set of new midambles in the combined multiple-slot, and adopting different modulation modes, such as 8PSK, 16QAM, or 64QAM, etc., in the combined large time slot, the data transmission rate and the spectrum utilization rate are increased.

In a CDMA TDD system, by means of the method of the present invention, the data transmission rate can be increased by about 3% to 10%. With this method, the problem of being not able to transmit traffic data with a transmission rate of 384 kbps or 2 Mbps within a single time slot in TD-SCDMA system is solved, which makes the user terminal with the receiving capacity of only one time slot would be able to receive high-rate data signals. Furthermore, by implementing the method of the present invention, the design of the user terminal can be simplified, the power consumption thereof can be reduced, and the coverage of the cell can be enlarged.

These and other aspects of the present invention are described more fully herein.

DETAILED DESCRIPTION OF THE INVENTION

This invention will be described in more detail hereinafter with reference to the accompanying drawings.

In accordance with one embodiment of the present invention, the data transmission rate can be increased by making use of a new frame structure and the method provided therewith. Take TD-SCDMA system as an example. When a higher data transmission rate is needed, for instance, when a 12.2 kbps voice is to be transmitted, the data is transmitted not by the current method, such as decreasing the spreading factor (decreasing from 16 to 8) or using two code channels to transmit data of one service, but by the method of combining two neighboring time slots to form a larger time slot for the data transmission.

Figure 2:
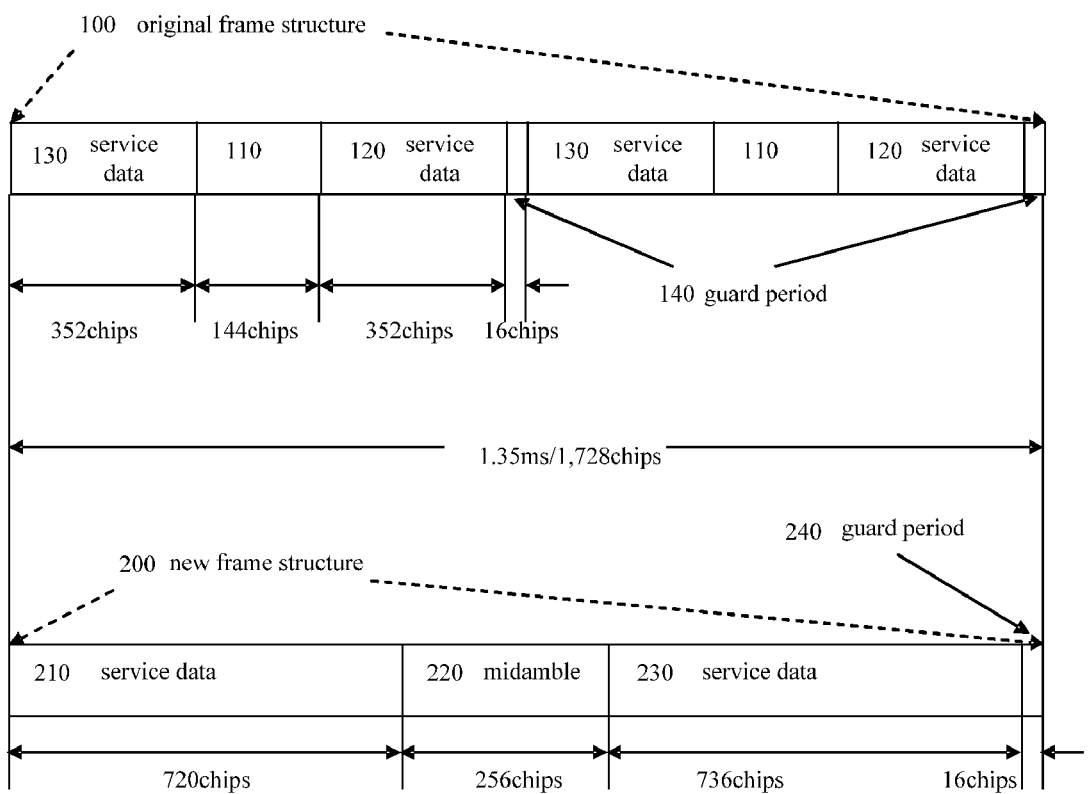
FIG. 2 is a schematic diagram illustrating the structure of a double length time slot according to an embodiment of the present invention.

Now referring to FIG. 2, which illustrates the frame structure of a larger time slot formed by combining two neighboring time slots of original frame structure (called a double time slot), it can be seen that the original frame structure 100 has two neighboring time slots. Each time slot consists of two service data fields 130 and 120 with a length of 352 chips respectively, one midamble 110 with a length of 144 chips and one guard period, g 140, with a length of 16 chips. The new frame structure consists of two service data fields 210 and 230 with lengths of 720, 736 chips respectively, one midamble 220 with a length of 256 chips, and one guard period 240 with a length of 16 chips. The length of the new time slot doubles the length of the original time slot, and the direct sequence spreading multi-access mode with the spreading factor up to 16 can be adopted. The number of total chips of the two original frames and the number of chips in the new frame are the same, which are 1728 chips. In the new frame structure, the lengths of two service data fields are basically the same; and it is recommended that the length of the midamble be 256 chips in a double time slot. When the length of the midamble is shorter, the transmission efficiency is higher, but performance is decreased. Contrastingly, when the length of the midamble is longer, the transmission efficiency is lower, but the performance is better. The guard period in the combined time slot still has a length of 16 chips.

Figure 3:
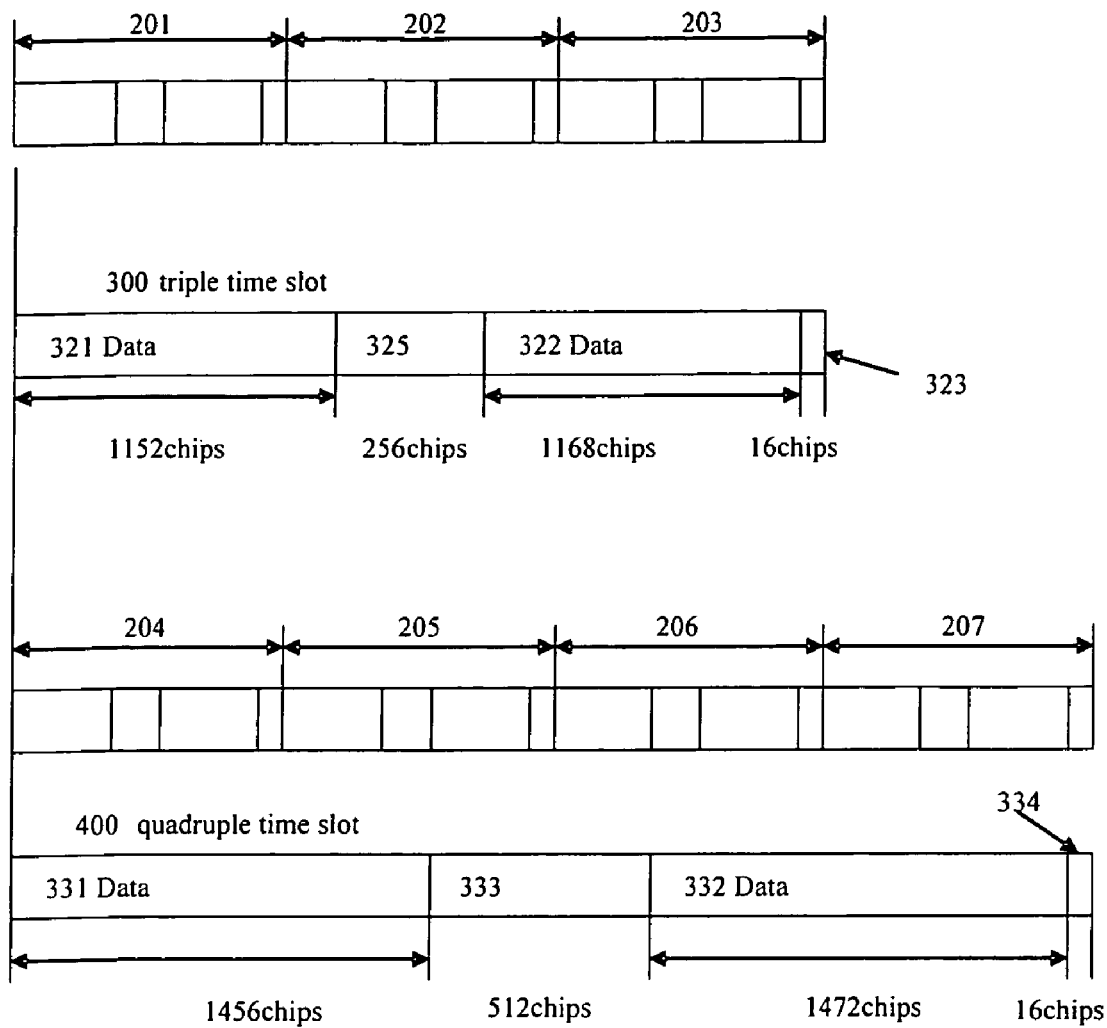
FIG. 3 is a schematic diagram illustrating the structure of a combined multi-slot according to an embodiment of the present invention.

Now referring to FIG. 3, which illustrates a time slot structure with three neighboring time slots 201, 202 and 203 combined into one larger time slot 300 (called a triple time slot), or a time slot structure with four neighboring time slots 204, 205, 206 and 207 combined into one larger time slot 400 (called a quadruple time slot), it can be seen that the triple time slot and the quadruple time slot (new combined time slots) are three times or four times of the length of the original time slot, respectively, and adopt the direct sequence spreading multi-access mode with the spreading factor up to 16. The triple time slot has a front service data field 321 with a length of 1152 chips, a rear service data field 322 with a length of 1168 chips, one midamble 325 with a length of 256 chips and one guard period 323 with a length of 16 chips. The quadruple time slot has a front service data field 331 with a length of 1456 chips, a rear service data field 332 with a length of 1472 chips, one midamble 333 with a length of 512 chips and one guard period 334 with a length of 16 chips.

Figure 1:
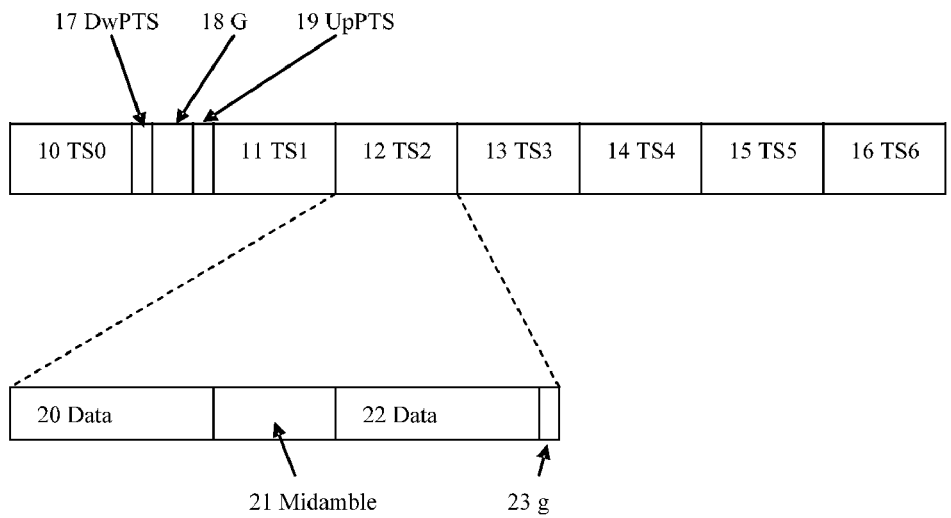
FIG. 1 is a schematic diagram illustrating the frame structure of TD-SCDMA mobile communication system.

It should be noted that the original frame structure 100 represents two neighboring time slots shown in FIG. 1; and the frame structure shown as 200, 300 or 400 according to the preferred embodiment of the present invention represents a larger time slot which consists of two, three or four neighboring time slots, wherein one code channel still consists of four fields: two service data fields 210 and 230, 321 and 322, 331 and 332, one midamble 220, 325, 333 and one guard period 240, 323, 334. When the length of service data field is increased, the length of the midamble should be increased accordingly so as to maintain the performance of the system. It is recommended that in the double time slot shown in FIG. 2, the length of the midamble be 256 chips, and in the triple time slot and quadruple time slot, the length of the midamble be 256 and 512 chips, respectively. Obviously, the length of the midamble is not limited to the recommendatory values; it can also take other value based on the requirement of the system performance.

While making use of the double time slot as shown in FIG. 2, each code channel can accommodate 91 symbols for transmission, that is 45 symbols in the first service data field 210 and 46 symbols in the second service data field 230. In this way, traffic data of 36.4 kbps can be transmitted in the QPSK modulation mode, which fulfil the requirement of the typical 3GPP service, such as 12.2 kbps voice service using R=⅓ channel coding. With 8 code channels, data service with a transmission rate of 128 kbps or 144 kbps can be provided. The advantages brought by this approach are: the volume of transmitted traffic data is increased by about 3.2%; the transmitting power is reduced to about only half of the original transmitting power, or with the transmitting power remaining the same as the original transmitting power, and the communication distance is increased (the increment varies with the different operating environment).

When a higher transmission rate is needed, a method can be used to combine more original time slots and form an even larger time slot still consisting of two service data fields, one midamble and one guard period. Thus there is no need to use the method of multiple slots at present.

While making use of the triple time slot 300, the length of the midamble 325 can be the same as the length of the midamble 220 in the double time slot as shown in FIG. 2. In this way, the volume of the service data fields 321, 322 are increased accordingly. But in the larger time slot 400 formed by combining four time slots, the length of the midamble 333 should be increased.

While making use of the triple time slot 300 as shown in FIG. 3, and when the spreading factor used is 16, each code channel can accommodate 145 symbols for transmission, that is, 72 symbols in the first service data field 321 and 73 symbols in the second service data field 322. In the QPSK modulation mode, each big code channel (triple code channel) can provide a transmission rate of 58 kbps, thus the triple time slot totally can provide a data transmission rate of 928 kbps, increasing the original transmission rate by about 10%. When using R=⅓ error correction coding, the triple time slot can transmit a service with a transmission rate of 384 kbps.

While making use of the quadruple time slot 400 as shown in FIG. 3, it is recommended that the length of the midamble 333 be increased to 512 chips. In this way, when the spreading factor is 16, each code channel can accommodate 183 symbols for transmission, that is, 91 symbols in the first service data field 331 and 92 symbols in the second data fields 332. In the QPSK modulation mode, each big code channel (quadruple code channel) can provide a data transmission rate of 73.2 kbps, and thus the quadruple time slot totally can provide a data transmission rate of 1.17 Mbps.

In FIGS. 2 and 3, the midamble of the combined time slot is located at the middle of the combined time slot, and the number of the midamble is only one. But in implementation, the number and the location of the midamble are not limited thereto, the midamble can be located at anywhere of the time slot and more than one midamble can be used in one combined time slot.

Figure 4:
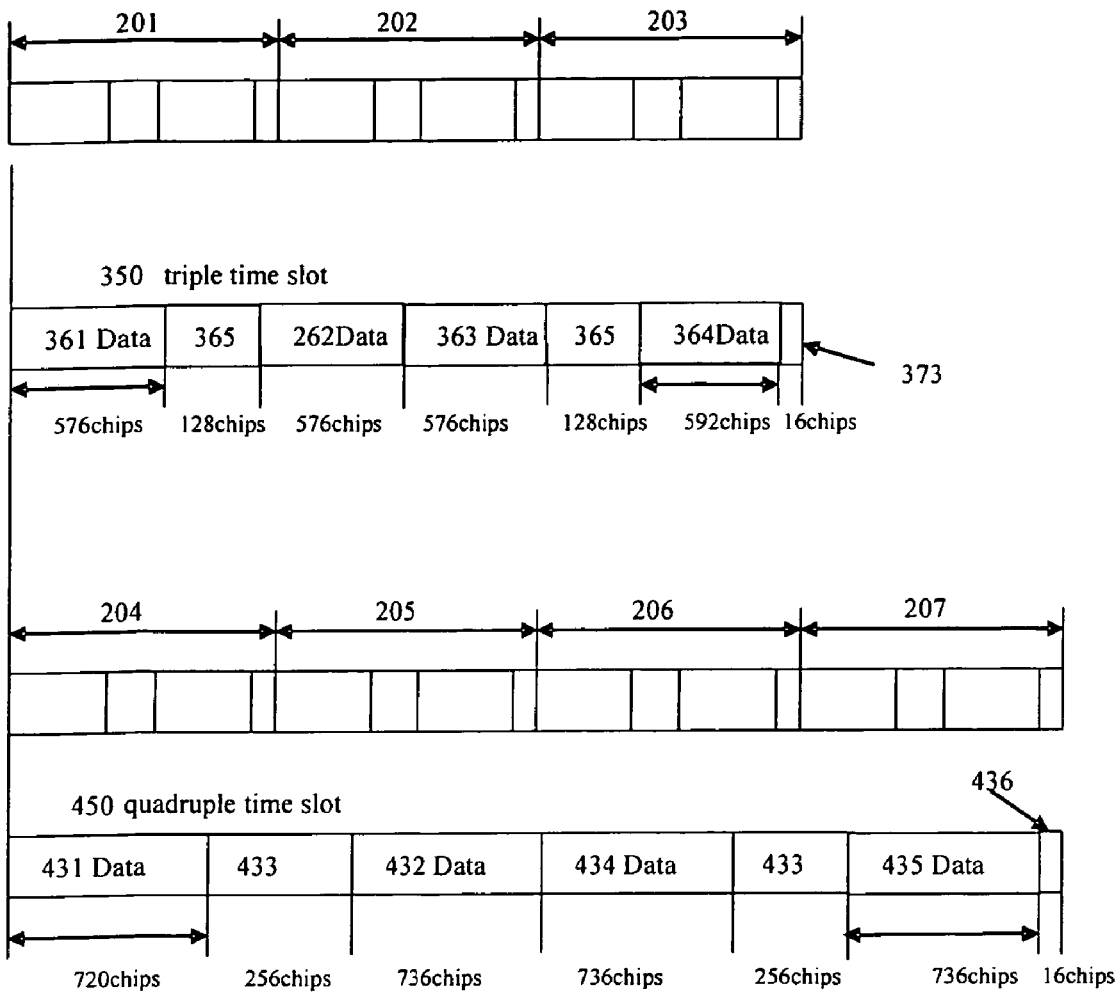
FIG. 4 is a schematic diagram illustrating the structure of a combined multi-slot according to another embodiment of the present invention.

FIG. 4 illustrates another frame structure of a combined time slot. Three original time slots 201, 202 and 203 are combined into a triple time slot 350 which has two midambles 365 with a length of 128 chips, four service data fields 361, 362, 363 and 364 and one guard period 373. The quadruple time slot 450 also has two midambles 433 with a length of 256 chips each and four service data fields 431, 432, 434 and 435. The data transmission efficiency of this embodiment is the same as that of the embodiment shown in FIG. 3; but since two midambles are used, the ability of overcoming multi-path fading and fast fading is enhanced while the complexity of data processing is increased accordingly. Naturally, the length of the midamble should be increased along with the increasing number of original neighboring time slots involved in the combination.

Analogous to the above, more neighboring original time slots can be combined to form a time slot of five times the original length, a time slot of six times the original length, and so on, which makes the CDMA TDD technology support a higher data transmission rate, and at the same time, simplifies the signal processing procedure of the user terminal, decreases the power consumption, as well as improves the coverage of the system.

The method of the embodiments according to the present invention also makes it more convenient to use a higher order modulation mode in some of the time slots. Take the double time slot shown in FIG. 2 as an example. When using 8PSK modulation mode in the double time slot, the data transmission rate of each code channel will be up to 54.6 kbps, 50% higher than the transmission rate of using QPSK modulation mode; when using 16QAM modulation mode, the data transmission rate of each code channel will be up to 72.8 kbps, which doubles the data transmission rate of using QPSK modulation mode; when using 64QAM modulation mode, the data transmission rate of each code channel will be up to 145.6 kbps, which doubles the data transmission rate of using 16QAM modulation mode.

Figure 5:
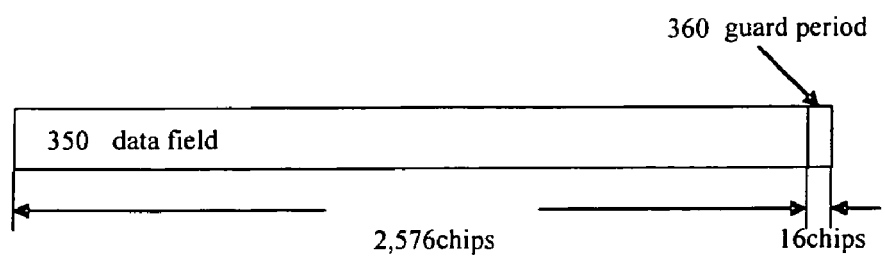
FIG. 5 is a schematic diagram illustrating the frame structure for transmitting a 2 Mbps service with a triple-length time slot according to an embodiment of the present invention.

The method can be used to further increase the transmission rate. For example, by using 16QAM modulation mode and deleting the midamble field from the triple time slot 300 shown in FIG. 3, a triple time slot is formed as shown in FIG. 5, which merely consists of data field 350 and guard period 360. The data field has a length of 2,576 chips, and the total data transmission rate supported is up to 2.061 Mbps. In this way, while transmitting a 2.048 Mbps traffic data, a 12 kbps signaling can also be transmitted. When the method is used in the TD-SCDMA system, three time slots, such as TS1, TS2 and TS3, can be combined to form a triple time slot shown in FIG. 5 for uplink transmission; and another three time slots, such as TS4, TS5 and TS6, can be combined to form a triple time slot shown in FIG. 5 for downlink transmission. In this way, the two-way transmission of a 2 Mbps service is realized, and comparing with the previous one-way transmission of a 2 Mbps service, the performance is also greatly improved which fulfilled the requirement for the third generation mobile communication system by ITU.

The step of combining multiple neighboring time slots to form a larger time slot can be fully implemented by software.

In accordance with the method described, multiple neighboring time slots can be combined to form a larger time slot with a length of integer times of the original length. The combined time slot can have a similar structure to the original time slot; and the length of the midamble can be changed along with the length of the time slot while the length of the guard period may remain unchanged. A higher order modulation mode can be used in the combined time slot to increase the data transmission rate.

That which is claimed:

1. A method for increasing the transmission rate in a multi-slot Code Division Multiple Access, (CDMA), wireless communication system, comprising the steps of:

A. combining a plurality of neighboring time slots to form one combined time slot, wherein the combined time slot has a length that is integer times a length of an original time slot, wherein each of the plurality of neighboring time slots comprises service data fields;

B. transmitting traffic data with at least one service data field in the combined time slot, and using one guard period in the combined time slot for guard between combined time slots, wherein total size of the at least one service data field in the combined time slot is larger than total size of the service data fields in the plurality of neighboring time slots, wherein more than two service data fields with approximate lengths are used for transmitting traffic data; and more than one midamble field for improving the transmission performance of the system are set among the service data fields, and the length of the midamble increases along with the increasing number of neighboring time slots that are combined to form the combined time slot.

2. A method for increasing the transmission rate in a multi-slot Code Division Multiple Access, (CDMA), wireless communication system, comprising the steps of:

A. combining a plurality of neighboring time slots to form one combined time slot, wherein the combined time slot has a length that is integer times a length of an original time slot, wherein each of the plurality of neighboring time slots comprises service data fields;

B. transmitting traffic data with at least one service data field in the combined time slot, and using one guard period in the combined time slot for guard between combined time slots, wherein total size of the at least one service data field in the combined time slot is larger than total size of the service data fields in the plurality of neighboring time slots, wherein two neighboring time slots are combined to form a double time slot, two service data fields, a front service data field and a rear service data field with the lengths of 720 chips and 736 chips respectively, are used for transmitting traffic data such that an integer number of symbols can be accommodated for transmission when the spreading factor is 16, and a midamble with a length of 256 chips for improving the transmission performance of the system is set between the front service data field and the rear service data field, and a guard period with a length of 16 chips is used.

3. A method for increasing the transmission rate in a multi-slot Code Division Multiple Access, (CDMA), wireless communication system, comprising the steps of:

A. combining a plurality of neighboring time slots to form one combined time slot, wherein the combined time slot has a length that is integer times a length of an original time slot, wherein each of the plurality of neighboring time slots comprises service data fields;

B. transmitting traffic data with at least one service data field in the combined time slot, and using one guard period in the combined time slot for guard between combined time slots, wherein total size of the at least one service data field in the combined time slot is larger than total size of the service data fields in the plurality of neighboring time slots wherein three neighboring time slots are combined to form a triple time slot, two service data fields, a front service data field and a rear service data field with the lengths of 1152 chips and 1168 chips respectively, are used for transmitting traffic data such that an integer number of symbols can be accommodated for transmission when the spreading factor is 16, and a midamble with a length of 256 chips for improving the transmission performance of the system is set between the front service data field and the rear service data field, and a guard period with a length of 16 chips is used.

4. A method for increasing the transmission rate in a multi-slot Code Division Multiple Access, (CDMA), wireless communication system, comprising the steps of:

A. combining a plurality of neighboring time slots to form one combined time slot, wherein the combined time slot has a length that is integer times a length of an original time slot, wherein each of the plurality of neighboring time slots comprises service data fields;

B. transmitting traffic data with at least one service data field in the combined time slot, and using one guard period in the combined time slot for guard between combined time slots, wherein total size of the at least one service data field in the combined time slot is larger than total size of the service data fields in the plurality of neighboring time slots wherein four neighboring time slots are combined to form a quadruple time slot, two service data fields, a front service data field and a rear service data field with the lengths of 1456 chips and 1472 chips respectively, are used for transmitting traffic data such that an integer number of symbols can be accommodated for transmission when the spreading factor is 16, and a midamble with a length of 512 chips for improving the transmission performance of the system is set between the front service data field and the rear service data field, and a guard period with a length of 16 chips is used.

5. A method for increasing the transmission rate in a multi-slot Code Division Multiple Access, (CDMA), wireless communication system, comprising the steps of:

A. combining a plurality of neighboring time slots to form one combined time slot, wherein the combined time slot has a length that is integer times a length of an original time slot, wherein each of the plurality of neighboring time slots comprises service data fields;

B. transmitting traffic data with at least one service data field in the combined time slot, and using one guard period in the combined time slot for guard between combined time slots, wherein total size of the at least one service data field in the combined time slot is larger than total size of the service data fields in the plurality of neighboring time slots; and in a TD-SCDMA mobile communication system, combining three neighboring time slots to form a triple time slot, using QPSK modulation mode and $R=\frac{1}{3}$ channel coding, and transmitting the data service with a rate of 384 kbps in a single triple time slot.

6. A method for increasing the transmission rate in a multi-slot Code Division Multiple Access, (CDMA), wireless communication system, comprising the steps of:

A. combining a plurality of neighboring time slots to form one combined time slot, wherein the combined time slot has a length that is integer times a length of an original time slot, wherein each of the plurality of neighboring time slots comprises service data fields;

B. transmitting traffic data with at least one service data field in the combined time slot, and using one guard period in the combined time slot for guard between combined time slots, wherein total size of the at least one service data field in the combined time slot is larger than total size of the service data fields in the plurality of neighboring time slots, wherein step A and step B comprise:

combining the standardized time slots, TS1, TS2 and TS3 in a TD-SCDMA mobile communication system to form a triple time slot for uplink traffic data transmission;

combining the standardized time slots, TS4, TS5 and TS6 to form a triple time slot for downlink traffic data transmission; and transmitting the traffic data with a transmission rate of 2 Mbps in both directions in 16QAM modulation mode without channel coding.

* * * * *

UNITED STATES PATENT AND TRADEMARK OFFICE
CERTIFICATE OF CORRECTION

PATENT NO. : 7,586,883 B2 Page 1 of 1
APPLICATION NO. : 11/252047
DATED : September 8, 2009
INVENTOR(S) : Shihe Li It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 849 days.

Signed and Sealed this

Twenty-first Day of September, 2010

David J. Kappos
*Director of the United States Patent and Trademark Office*